United States Patent Office 3,121,705
Patented Feb. 18, 1964

3,121,705
POLYMERIZATION OF POLYVINYL ACETATE WITH AN INITIATOR OF t-BUTYL PEROXYPIVALATE AND SUBSEQUENT HYDROLYSIS TO PRODUCE POLYVINYL ALCOHOL
Arthur I. Lowell, Amherst, and Orville L. Mageli, Grand Island, N.Y., assignors to Wallace & Tiernan Inc., Newark, N.J.
No Drawing. Filed Sept. 26, 1961, Ser. No. 140,692
3 Claims. (Cl. 260—91.3)

This invention relates to a method of preparing a sizing, coating and thickener from vinyl acetate by polymerizing this monomer with a specific peroxy ester; namely, a peroxy ester of pivalic acid, and obtaining from this polymer the desired polyvinyl alcohol.

The advantage of using a peroxy ester of pivalic acid, i.e., trimethyl acetic acid, resides in the inherent characteristic of such peroxy esters to carry the polymerization of vinyl acetate to a specified degree.

Heretofore, 50% aqueous suspensions of vinyl acetate $CH_2=CH-O-COCH_3$ have been prepared using benzoyl peroxide as the polymerization initiator. The polymerization of vinyl acetate is begun at 70° C. and under heat; vinyl acetate refluxes; the temperature rises and the volatile monomer is converted to a non-volatile polymer. The end product is a suspension of beads of the polymer and this procedure is sometimes called "bead" polymerization. When a molar benzene solution possesses a viscosity of 800 to 1000 centipoises, the polymer is isolated and hydrolyzed with an alcohol, generally methyl alcohol, because of cheapness.

The end product so produced generally had a viscosity of 60 centipoises in 4% aqueous solution at 20° C. and was called fully hydrolyzed polyvinyl alcohol. The art wanted a higher viscosity and the present invention provides such a product and a method of preparing it.

This invention permits the preparation of a fully hydrolyzed polyvinyl alcohol of a higher viscosity at a given concentration than was available heretofore.

In accordance with the present invention, a polyvinyl acetate is prepared at a low temperature and low energy level whereby the so-called branching inherent in the older processes is reduced or damped.

An advantage in the preparation of polyvinyl alcohol by the method of the present invention is to produce a higher molecular weight product and it is, therefore, possible to obtain a polyvinyl alcohol solution possessing a lower solids content and higher viscosity than heretofore.

An additional advantage of the invention is believed to reside in the production, therefore, of a main polymer chain which retains its integrity after hydrolysis because of minimization of branching.

In the broad aspect of the invention, vinyl acetate in aqueous solution and in the presence of a protective colloid is polymerized with a specific organic peroxy ester; namely, t-butylperoxy pivalate, the polymerization being effected initially at relatively low temperature, in the neighborhood of about 40° C.

*Example 1*

As a specific illustration of the polymerization, there was charged into a jacketed vessel: 100 parts by weight vinyl acetate, 0.5 part of hydrolyzed polyvinyl acetate as a protective colloid based on water phase, and 100 parts by weight of water. There was added 0.16% by weight of t-butylperoxy pivalate based on the vinyl acetate.

The reaction mixture was agitated and the temperature maintained at about 40° C. for about 8 hours, at which time the reaction was complete.

The polymer product was in the form of fine beads or pearls, which beads were separated from the remainder of the reaction mixture, washed and dried.

The dry beads were hydrolyzed in conventional manner to produce polyvinyl alcohol by dissolving them in any suitable alcohol, preferably one of the lower monohydric alcohols, and the reaction mixture heated to effect alcoholysis of the ester in an alkaline environment.

The alkaline environment is generally obtained by the use of any suitable inorganic base such as a metal oxide, hydroxide or carbonate, caustic soda being preferred by reason of cost. It will be found preferable to effect the alcoholysis with ether methyl or ethyl alcohol, thus gradually precipitating the polyvinyl alcohol from the solution.

The insoluble precipitated particles of polyvinyl alcohol produced, in 4% aqueous solution and at 20° C., a product having a viscosity of 540 centipoises (Brookfield).

As an example of a prior art procedure, using an active organic peroxide, other than a peroxypivalate as a source of free radicals for the polymerization, there was employed bis 2,4-di-chlorobenzoyl peroxide. The polymerization was run in substantially the same fashion as in the example above, at a temperature of 40° C. for 8 hours, at the end of which time there was about 95% conversion to polyvinyl acetate. The beads produced here were relatively large. Upon hydrolysis, as outlined above, polyvinyl alcohol was produced which, at 20° C. and at 4% aqueous solution, possessed a Brookfield viscosity of 60 centipoises. Acceptable polymerization to produce the high viscosity alcohol described herein could not be prepared by homologs of t-butylperoxy trimethyl acetate (pivalic acid). Neither the mono-substituted methyl derivative (t-butylperoxy methyl acetate) nor di-substituted methyl derivative (t-butylperoxy dimethyl acetate) produced acceptable results.

It is believed that t-butylperoxy pivalate is able to control the course of polymerization to produce an unbranched chain of polymer as contrasted with the mechanism of polymerization occurring heretofore when using other well known and available peroxy compounds providing free radicals.

At high temperatures, i.e., 70° C. and above, the polymerization tends to form a final polyvinyl alcohol of lower viscosity in 4% aqueous solution. By employing the t-butyl peroxypivalate as the polymerization initiator, a relatively low temperature, low energy level polymerization of vinyl acetate is effected which it is believed makes possible production of backbone chains with less branched chains which remain as long chains after hydrolysis, thus providing viscosities of 250 to 550 centipoises (Brookfield) in the usual 4% solution.

What is claimed is:
1. The method of preparing a polyvinyl alcohol which comprises heating at a low energy level and in the neighborhood of about 40° C. vinyl acetate in aqueous suspension and in the presence of a protective colloid with a catalytic amount of t-butyl peroxypivalate until the vinyl acetate has been changed to polyvinyl acetate and then hydrolyzing the polyvinyl acetate to produce polyvinyl alcohol.

2. The method of preparing a polyvinyl alcohol which comprises heating at a low energy level and in the neighborhood of about 40° C. vinyl acetate in aqueous suspension and in the presence of a protective colloid with a catalytic amount of t-butyl peroxypivalate until the vinyl acetate has been changed to polyvinyl acetate and then hydrolyzing the polyvinyl acetate with a lower aliphatic monohydric alcohol.

3. The method of preparing a polyvinyl alcohol which comprises heating at a low energy level and in the neighborhood of about 40° C. vinyl acetate in aqueous suspension and in the presence of a protective colloid with a catalytic amount of t-butyl peroxypivalate until the vinyl acetate has been changed to polyvinyl acetate and then heating the polyvinyl acetate with a lower aliphatic monohydric alcohol until the acetate has been alcoholized and polyvinyl alcohol produced.

References Cited in the file of this patent

UNITED STATES PATENTS

| | | |
|---|---|---|
| 2,843,576 | Dunn et al. | July 15, 1958 |
| 2,852,565 | Nozaki | Sept. 16, 1958 |
| 3,036,054 | Wheeler et al. | May 22, 1962 |